United States Patent
Teng

(10) Patent No.: US 12,298,831 B2
(45) Date of Patent: May 13, 2025

(54) PRESENCE DETECTION USING COMPRESSIVE SAMPLING

(71) Applicant: QUALCOMM Incorporated, San Diego, CA (US)

(72) Inventor: Diyan Teng, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 18/339,629

(22) Filed: Jun. 22, 2023

(65) Prior Publication Data

US 2024/0427403 A1 Dec. 26, 2024

(51) Int. Cl.
*G06F 1/32* (2019.01)
*G06F 1/16* (2006.01)
*G06F 1/3231* (2019.01)

(52) U.S. Cl.
CPC .......... *G06F 1/3231* (2013.01); *G06F 1/1694* (2013.01)

(58) Field of Classification Search
CPC .............................. G06F 1/3231; G06F 1/1694
See application file for complete search history.

(56) References Cited

U.S. PATENT DOCUMENTS

| | | | |
|---|---|---|---|
| 2003/0177402 A1* | 9/2003 | Piazza ................... | G06F 1/3231 713/300 |
| 2014/0149754 A1* | 5/2014 | Silva ...................... | G06F 3/017 713/300 |
| 2014/0184518 A1* | 7/2014 | Valavi ................... | G06F 1/3231 345/173 |
| 2016/0044394 A1* | 2/2016 | Derom ................... | G01S 15/04 367/95 |
| 2017/0229073 A1* | 8/2017 | Ficner ..................... | H04N 5/33 |
| 2018/0348849 A1* | 12/2018 | Lingutla ............... | G06F 1/3296 |
| 2020/0133373 A1* | 4/2020 | Huang ................... | G06F 1/3287 |
| 2022/0256472 A1* | 8/2022 | Lagnado ............... | G06F 1/3231 |
| 2024/0168567 A1* | 5/2024 | Barachant ............... | G06F 1/163 |

* cited by examiner

*Primary Examiner* — Zahid Choudhury
(74) *Attorney, Agent, or Firm* — QUALCOMM Incorporated

(57) ABSTRACT

In some aspects, a device may obtain a signal of a vibration sensor. The device may perform compressive sampling of the signal by combining each set of data points, of a plurality of sets of data points of the signal, with a compressive sampling matrix to obtain a plurality of compressive measurements of the signal. The device may determine whether the plurality of compressive measurements are indicative of a person present in a vicinity of the device. The device may cause the device to exit a low-power mode responsive to a determination that the plurality of compressive measurements are indicative of the person present in the vicinity of the device. Numerous other aspects are described.

30 Claims, 8 Drawing Sheets

US 12,298,831 B2

PRESENCE DETECTION USING COMPRESSIVE SAMPLING

FIELD OF THE DISCLOSURE

Aspects of the present disclosure generally relate to signal processing and, for example, to presence detection using compressive sampling.

BACKGROUND

In signal processing, sampling is the reduction of a continuous-time signal to a discrete-time signal. The continuous-time signal may be reconstructed from the discrete-time signal using one or more interpolation algorithms. The Nyquist rate or frequency is the minimum rate at which the continuous-time signal needs to be sampled to retain all of the information of the continuous-time signal. The Nyquist rate for a signal is equal to twice a highest frequency (bandwidth) of the signal.

SUMMARY

Some aspects described herein relate to a method. The method may include obtaining, by a device, a signal of a vibration sensor. The method may include performing, by the device, compressive sampling of the signal by combining each set of data points, of a plurality of sets of data points of the signal, with a compressive sampling matrix to obtain a plurality of compressive measurements of the signal. The method may include determining, by the device, whether the plurality of compressive measurements are indicative of a person present in a vicinity of the device. The method may include causing, by the device, the device to exit a low-power mode responsive to a determination that the plurality of compressive measurements are indicative of the person present in the vicinity of the device.

Some aspects described herein relate to a device. The device may include a memory and one or more processors coupled to the memory. The one or more processors may be configured to obtain a signal of a vibration sensor. The one or more processors may be configured to perform compressive sampling of the signal by combining each set of data points, of a plurality of sets of data points of the signal, with a compressive sampling matrix to obtain a plurality of compressive measurements of the signal. The one or more processors may be configured to detect, by the device, whether a person is approaching toward the device or leaving from the device in accordance with the plurality of compressive measurements.

Some aspects described herein relate to a non-transitory computer-readable medium that stores a set of instructions. The set of instructions, when executed by one or more processors of the device, may cause the device to obtain a signal of a vibration sensor. The set of instructions, when executed by one or more processors of the device, may cause the device to perform compressive sampling of the signal by combining each set of data points, of a plurality of sets of data points of the signal, with a compressive sampling matrix to obtain a plurality of compressive measurements of the signal. The set of instructions, when executed by one or more processors of the device, may cause the device to determine whether the plurality of compressive measurements are indicative of a person present in a vicinity of the device. The set of instructions, when executed by one or more processors of the device, may cause the device to cause the device to exit a low-power mode responsive to a determination that the plurality of compressive measurements are indicative of the person present in the vicinity of the device.

Some aspects described herein relate to an apparatus. The apparatus may include means for obtaining a signal of a vibration sensor. The apparatus may include means for performing compressive sampling of the signal by combining each set of data points, of a plurality of sets of data points of the signal, with a compressive sampling matrix to obtain a plurality of compressive measurements of the signal. The apparatus may include means for detecting whether a person is approaching toward the apparatus or leaving from the apparatus in accordance with the plurality of compressive measurements.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
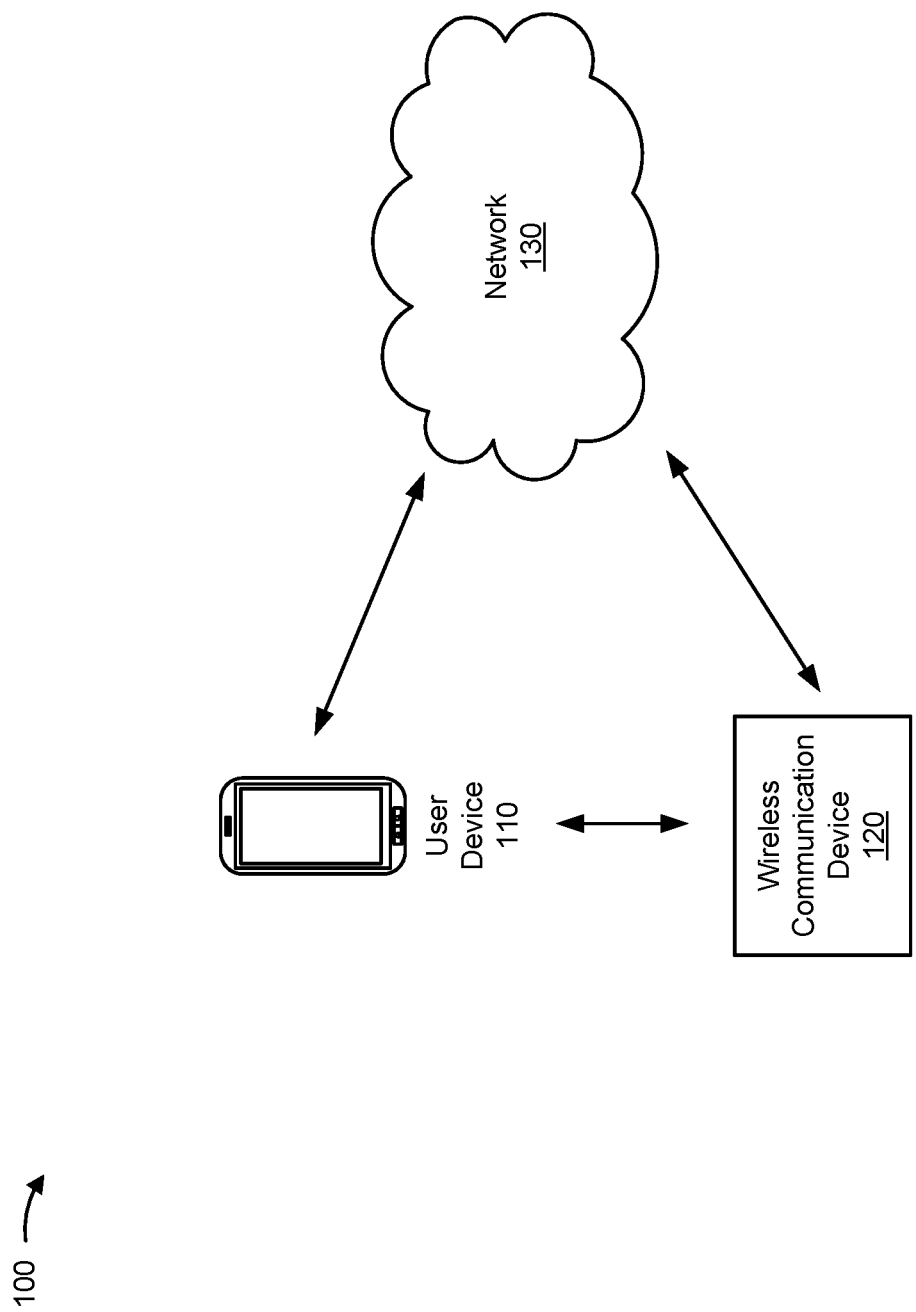
FIG. 1 is a diagram of an example environment in which systems and/or methods described herein may be implemented.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A mobile device, such as a smartphone, may employ a battery to power the mobile device. The battery may be relatively small and limited in capacity to enhance portability of the mobile device. The mobile device may perform numerous background sensing operations to detect characteristics associated with the mobile device, such as a condition of the mobile device and/or an environment of the mobile device. These sensing operations may consume significant power, thereby resulting in faster depletion of the battery. For example, to perform a sensing operation, the mobile device may take and process many samples of a sensor signal. Sampling of the sensor signal may be at or above a Nyquist rate to ensure that the mobile device obtains a sufficient number of samples for signal reconstruction. For example, loss of data may result from sampling below the Nyquist rate. Accordingly, the mobile device may be unable to conserve battery by reducing the sampling rate.

In some aspects described herein, a device may perform compressive sampling (e.g., at a sub-Nyquist rate) of a signal output by a vibration sensor of the device. To perform the compressive sampling, the device may combine (e.g., multiply) data points from the signal with a matrix of random values, such as a random Gaussian matrix, to obtain a plurality of compressive measurements. Using the compressive measurements (e.g., rather than reconstructing the signal from the compressive measurements), the device may detect whether a person is present in a vicinity of the device (e.g., whether a person is approaching toward the device or leaving from the device) with high accuracy. For example, the compressive sampling may preserve a pattern in the signal indicative of human presence that would otherwise by lost using conventional decimation at a sub-Nyquist rate. Moreover, the compressive sampling may conserve power relative to, while providing comparable accuracy as, conventional decimation at or above the Nyquist rate. Thus, the compressive sampling of the signal conserves the data of the signal while conserving power.

FIG. 1 is a diagram of an example environment 100 in which systems and/or methods described herein may be implemented. As shown in FIG. 1, environment 100 may include a user device 110, a wireless communication device 120, and a network 130. Devices of environment 100 may interconnect via wired connections, wireless connections, or a combination of wired and wireless connections.

The user device 110 may include one or more devices capable of receiving, generating, storing, processing, and/or providing information associated with presence detection using compressive sampling, as described elsewhere herein.

The user device 110 may include a communication device and/or a computing device. For example, the user device 110 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The wireless communication device 120 includes one or more devices capable of receiving, generating, storing, processing, and/or providing information associated with presence detection using compressive sampling. For example, the wireless communication device 120 may include a base station, an access point, and/or the like. Additionally, or alternatively, wireless communication device 120 may include a communication and/or computing device, such as a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 130 may include one or more wired and/or wireless networks. For example, the network 130 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 130 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
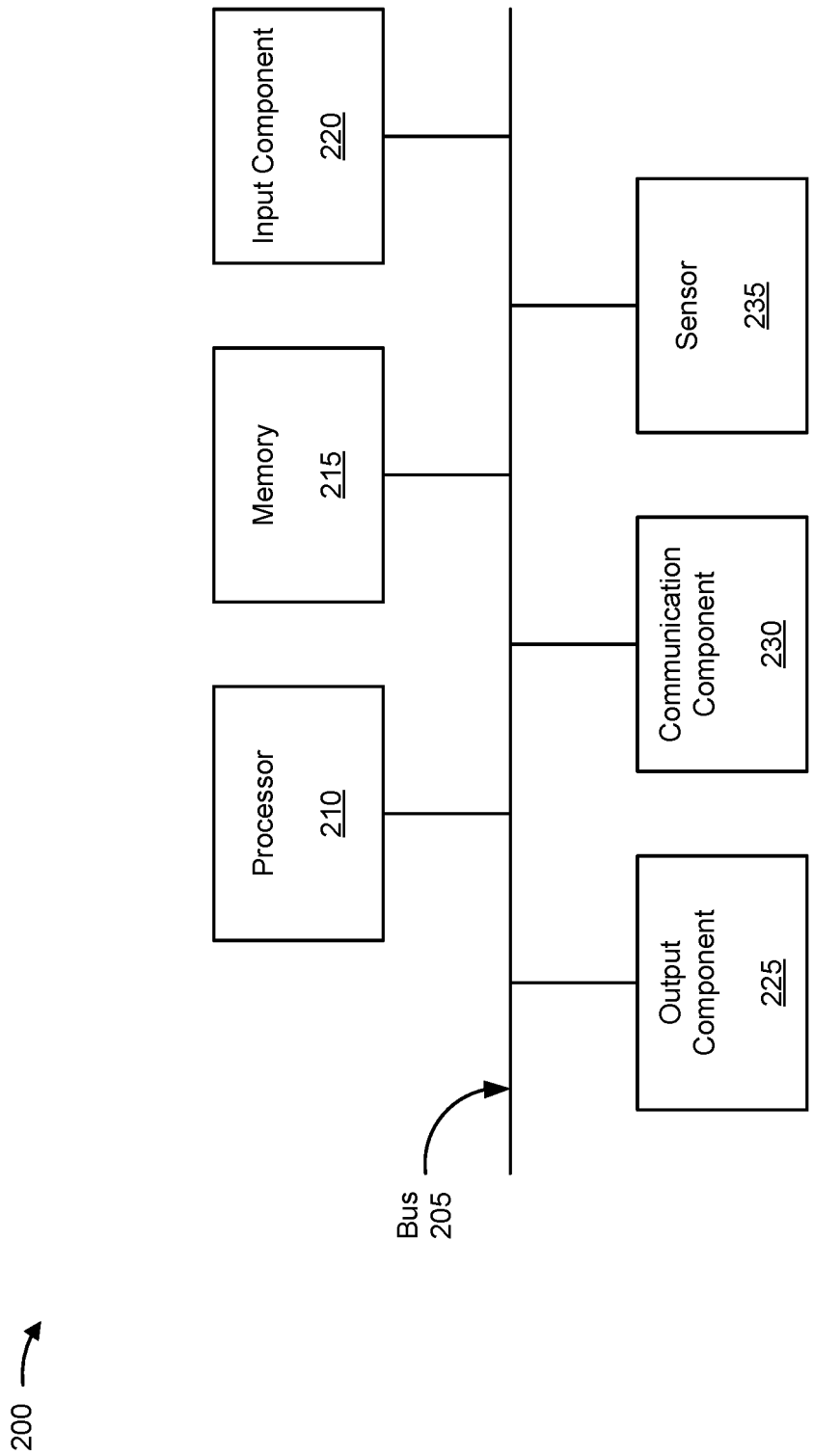
FIG. 2 is a diagram illustrating example components of a device, in accordance with the present disclosure.

FIG. 2 is a diagram illustrating example components of a device 200, in accordance with the present disclosure. The device 200 may correspond to the user device 110 and/or the wireless communication device 120. In some aspects, the user device 110 and/or the wireless communication device 120 may include one or more devices 200 and/or one or more components of the device 200. As shown in FIG. 2, the device 200 may include a bus 205, a processor 210, a memory 215, an input component 220, an output component 225, a communication component 230, and/or a sensor 235.

The bus 205 may include one or more components that enable wired and/or wireless communication among the components of the device 200. The bus 205 may couple together two or more components of FIG. 2, such as via operative coupling, communicative coupling, electronic coupling, and/or electric coupling. For example, the bus 205 may include an electrical connection (e.g., a wire, a trace, and/or a lead) and/or a wireless bus. The processor 210 may include a central processing unit, a graphics processing unit, a microprocessor, a controller, a microcontroller, a digital signal processor, a field-programmable gate array, an application-specific integrated circuit, and/or another type of processing component. The processor 210 may be implemented in hardware, firmware, or a combination of hardware and software. In some aspects, the processor 210 may include one or more processors capable of being programmed to perform one or more operations or processes described elsewhere herein.

The memory 215 may include volatile and/or nonvolatile memory. For example, the memory 215 may include random access memory (RAM), read only memory (ROM), a hard disk drive, and/or another type of memory (e.g., a flash memory, a magnetic memory, and/or an optical memory). The memory 215 may include internal memory (e.g., RAM, ROM, or a hard disk drive) and/or removable memory (e.g., removable via a universal serial bus connection). The memory 215 may be a non-transitory computer-readable medium. The memory 215 may store information, one or more instructions, and/or software (e.g., one or more software applications) related to the operation of the device 200. In some aspects, the memory 215 may include one or more memories that are coupled (e.g., communicatively coupled) to one or more processors (e.g., processor 210), such as via the bus 205. Communicative coupling between a processor 210 and a memory 215 may enable the processor 210 to read and/or process information stored in the memory 215 and/or to store information in the memory 215.

The input component 220 may enable the device 200 to receive input, such as user input and/or sensed input. For example, the input component 220 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 225 may enable the device 200 to provide output, such as via a display, a speaker, and/or a light-emitting diode. The communication component 230 may enable the device 200 to communicate with other devices via a wired connection and/or a wireless connection. For example, the communication component 230 may include a receiver, a transmitter, a transceiver, a modem, a network interface card, and/or an antenna.

The sensor 235 may include one or more devices capable of detecting a characteristic associated with the device 200 (e.g., a characteristic relating to a physical environment of the device 200 or a characteristic relating to a condition of the device 200). For example, the sensor 235 may include a vibration sensor, such as one or more inertial measurement units (IMUs), one or more accelerometers, one or more gyroscopes, and/or one or more microphones. Additionally, or alternatively, the sensor 235 may include one or more photodetectors (e.g., one or more photodiodes), one or more motion sensors, and/or one or more temperature sensors, among other examples.

The device 200 may perform one or more operations or processes described herein. For example, a non-transitory computer-readable medium (e.g., memory 215) may store a set of instructions (e.g., one or more instructions or code) for execution by the processor 210. The processor 210 may execute the set of instructions to perform one or more operations or processes described herein. In some aspects, execution of the set of instructions, by one or more processors 210, causes the one or more processors 210 and/or the device 200 to perform one or more operations or processes described herein. In some aspects, hardwired circuitry may be used instead of or in combination with the instructions to perform one or more operations or processes described herein. Additionally, or alternatively, the processor 210 may be configured to perform one or more operations or processes described herein. Thus, aspects described herein are not limited to any specific combination of hardware circuitry and software.

In some aspects, device 200 may include means for obtaining a signal of a vibration sensor, means for performing compressive sampling of the signal by combining each set of data points, of a plurality of sets of data points of the signal, with a compressive sampling matrix to obtain a plurality of compressive measurements of the signal, means for determining whether the plurality of compressive measurements are indicative of a person present in a vicinity of the device, and/or means for causing the device to exit a low-power mode responsive to a determination that the plurality of compressive measurements are indicative of the person present in the vicinity of the device. Additionally, or alternatively, device 200 may include means for obtaining a signal of a vibration sensor, means for performing compressive sampling of the signal by combining each set of data points, of a plurality of sets of data points of the signal, with a compressive sampling matrix to obtain a plurality of compressive measurements of the signal, and/or means for detecting whether a person is approaching toward the device or leaving from the device in accordance with the plurality of compressive measurements. In some aspects, the means for device 200 to perform processes and/or operations described herein may include one or more components of device 200 described in connection with FIG. 2, such as bus 205, processor 210, memory 215, input component 220, output component 225, communication component 230, and/or sensor 235.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3A:
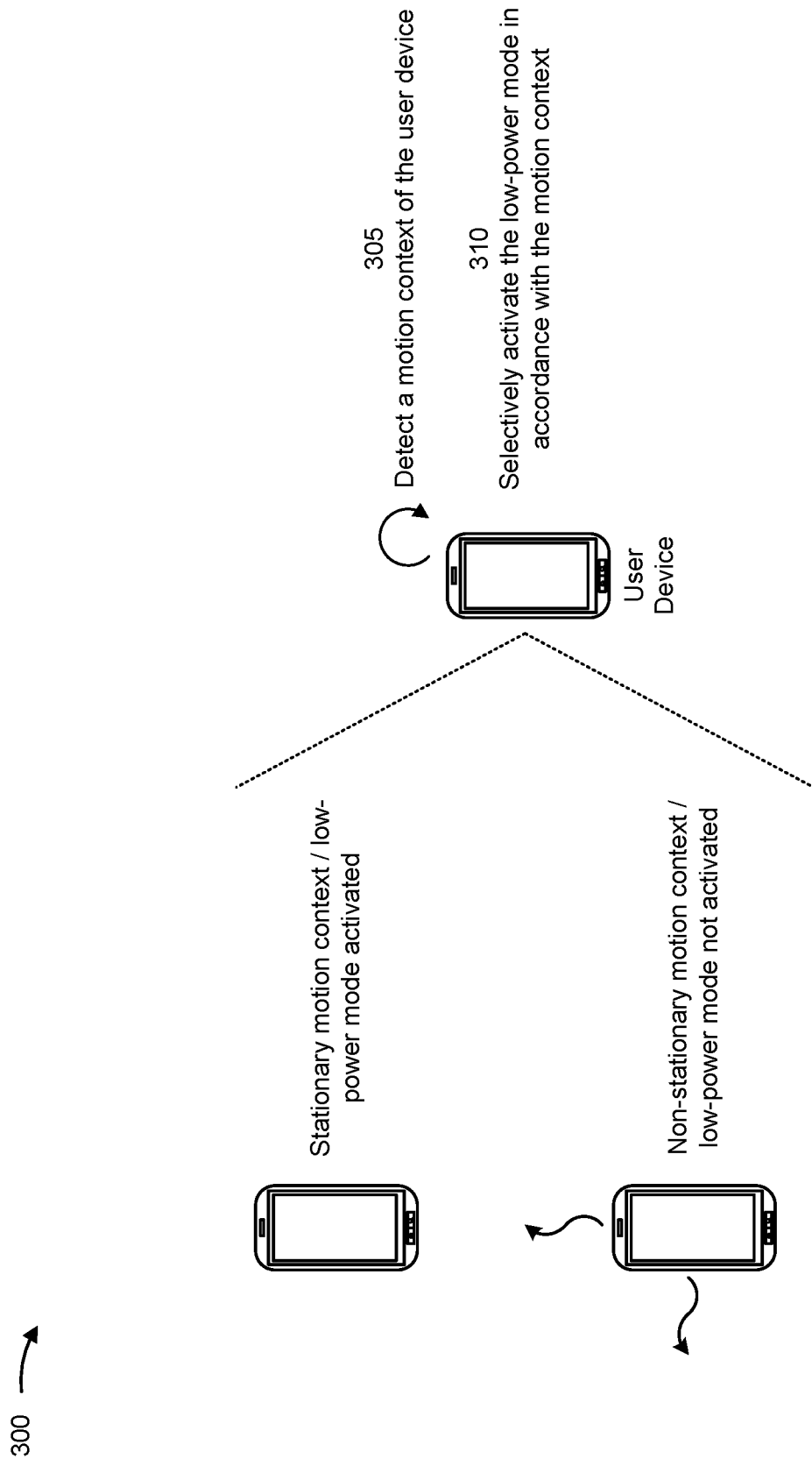
FIG. 3A-3C are diagrams illustrating an example associated with presence detection using compressive sampling, in accordance with the present disclosure.
Figure 3B:
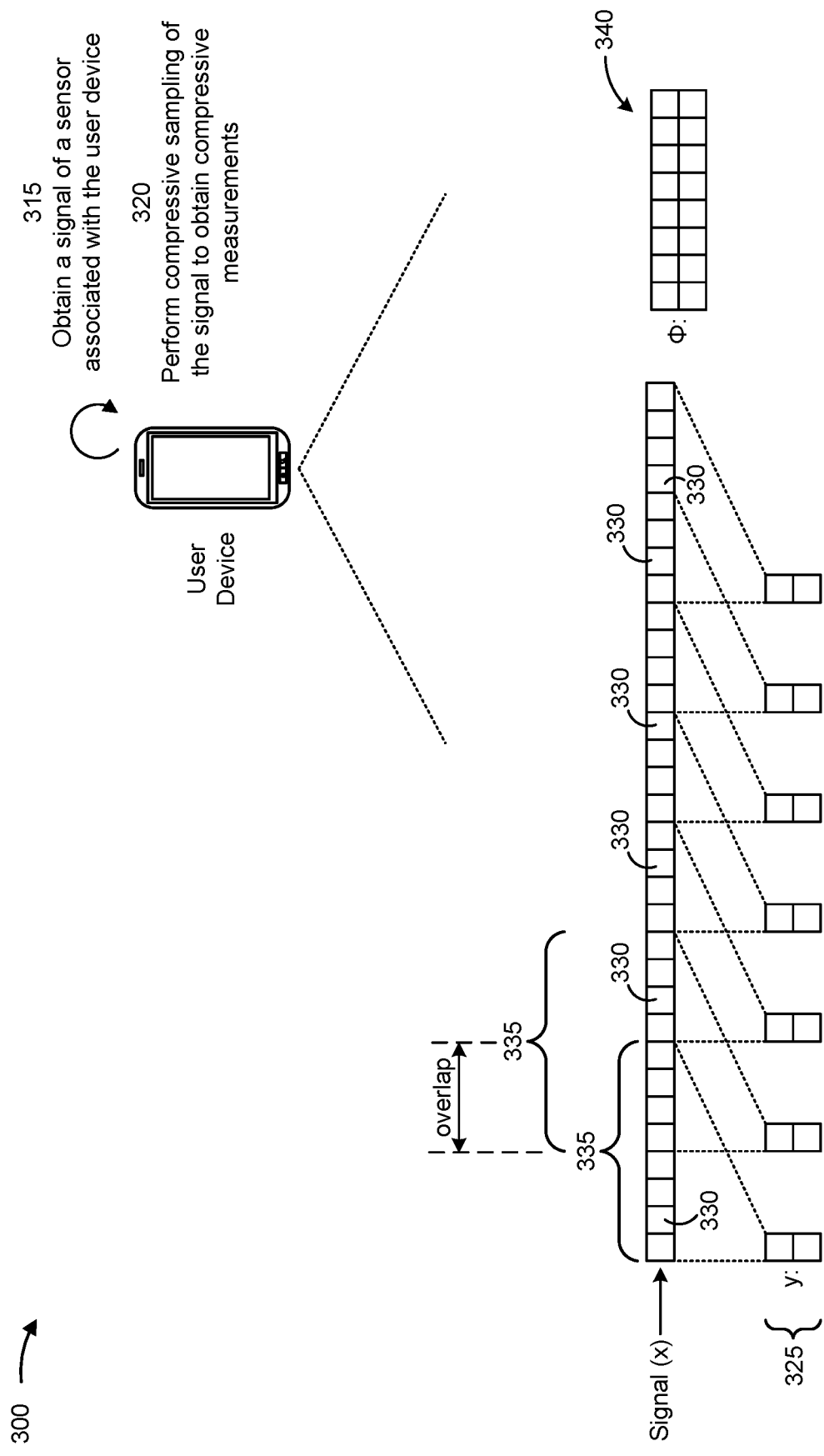
Figure 3C:
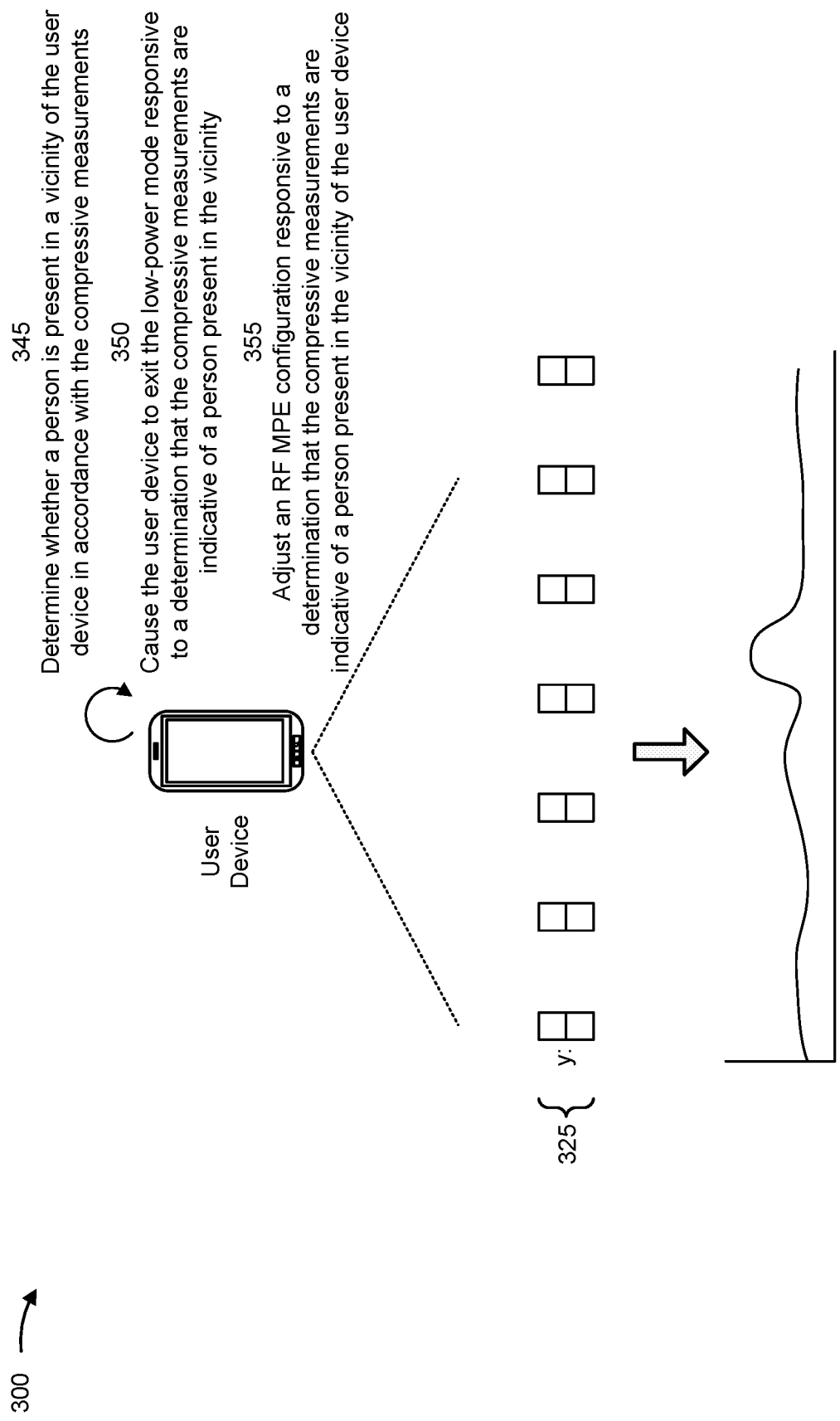

FIG. 3A-3C are diagrams illustrating an example 300 associated with presence detection using compressive sampling, in accordance with the present disclosure. As shown in FIGS. 3A-3C, example 300 includes a user device. The user device may be configured to transition into a low-power mode to conserve battery. For example, in the low-power mode, one or more processing tasks (e.g., background processing tasks) of the user device may be paused or performed less frequently. The processing tasks may relate to face authentication, biometric authentication, and/or a voice user interface, among other examples.

As shown in FIG. 3A, and by reference number 305, the user device may detect a motion context of the user device. For example, the user device may perform a context-detection operation to detect the motion context of the user device. To perform the context-detection operation, the user device may input sensor data (e.g., IMU data, accelerometer data, gyroscope data, or the like) to a machine learning model, and the machine learning model may output a motion context of the user device. The motion context may indicate a motion type indicated by the sensor data, such as walking, running, biking, or stationary, among other examples.

As shown by reference number 310, the user device may selectively activate the low-power mode in accordance with the motion context. For example, if the motion context is a first type of motion context (e.g., indicative of the user device being idle, such as a stationary motion context), then the user device may activate the low-power mode. Continuing with the example, if the motion context is a second type of motion context (e.g., indicative of the user device being active, such as a walking, running, or biking motion context), then the user device may not activate the low-power mode.

The user device may perform a presence-detection operation (e.g., to detect whether a person is approaching toward or leaving from the user device) in accordance with whether the low-power mode is activated. As described herein, the presence-detection operation may include sampling a signal of a sensor of the user device. If the low-power mode is not-activated, then the user device may perform the presence-detection operation at a relatively higher sampling rate (e.g., at or above a Nyquist rate, such as at 200 Hz). For example, the user device may use conventional decimation at or above the Nyquist rate. Otherwise, if the low-power mode is activated, then the user device may perform the presence-detection operation using a relatively lower sampling rate (e.g., a sub-Nyquist rate, such as at 10 Hz), as described herein. By using a lower sampling rate, the user device may expend less power and conserve battery in accordance with the low-power mode.

As shown in FIG. 3B, and by reference number 315, in connection with performing the presence-detection operation (e.g., when the low-power mode is activated), the user device may obtain a signal of a sensor associated with the user device (e.g., the sensor may be included in the user device or communicatively connected to the user device). The sensor may be a vibration sensor (i.e., a sensor capable of detecting vibration). For example, the vibration sensor may be an IMU, an accelerometer, a gyroscope, and/or a microphone, among other examples. In some aspects, the sensor may be another type of sensor, such as a photodetector (e.g., changes in light incident on the photodetector can be used to detect whether a person is approaching toward or leaving from the user device) or a temperature sensor (e.g., changes in temperature at the temperature sensor can be used to detect whether a person is approaching toward or leaving from the user device).

As shown by reference number 320, in connection with performing the presence-detection operation (e.g., when the low-power mode is activated), the user device may perform compressive sampling of the signal to obtain a plurality of compressive measurements 325 of the signal. For example, the user device may perform compressive sampling of the signal responsive to activation of the low-power mode of the user device (e.g., otherwise, if the low-power mode is not activated, then the user device may perform sampling of the signal using a conventional decimation technique at or above the Nyquist rate). The compressive sampling of the signal may include sampling of the signal at a sub-Nyquist rate. The compressive sampling of the signal may be possible because a person approaching toward or leaving from the user device may occur only sparsely over time (e.g., the presence-detection operation may use the compressive sampling by leveraging the sparse nature of an approaching/leaving event).

To perform the compressive sampling of the signal, the user device may monitor the signal at a plurality data points 330. For example, the plurality of data points 330 may correspond to an output data rate associated with the sensor (e.g., a relatively higher data rate, such as 200 Hz). The plurality of data points 330 may be divided into a plurality of sets 335 of data points 330, and each set 335 of data points 330 may correspond to a sampling window of the signal. For example, as shown, a sampling window of the signal may include a set 335 of eight data points 330.

To perform the compressive sampling of the signal, the user device may combine (e.g., multiply) each set 335 of data points 330 (e.g., a 1×n matrix, where n is the quantity of data points 330 in a set 335), of the plurality of sets 335 of data points 330 of the signal, with a compressive sampling matrix 340 to obtain the plurality of compressive measurements 325 of the signal. For example, the signal over time may be represented as $x_t$, the compressive sampling matrix 340 may be represented by $\Phi$, and the compressive measurements 325 over time, represented by $y_t$, may be equal to the product of $\Phi$ and $x_t$ ($y_t = \Phi x_t$). The user device may be provisioned (e.g., configured) with information indicating the compressive sampling matrix 340, and the compressive sampling matrix 340 may be used by the user device each time compressive sampling is performed (e.g., the compressive sampling matrix 340 is fixed for the user device).

The compressive sampling matrix 340 may include random values (e.g., obtain using one or more random sampling techniques). For example, the compressive sampling matrix 340 may be a random Gaussian matrix, or another matrix with similar properties as a random Gaussian matrix. In some aspects, the compressive sampling matrix 340 may be a random discrete Fourier transform (DFT) matrix or a random Bernoulli matrix, among other examples. In some aspects, the compressive sampling matrix 340 may be a convolution of a random-value matrix (e.g., a Gaussian matrix) with a matrix representing a shape of a waveform of the signal, thereby improving a precision of the compressive measurements 325.

A column dimension of the compressive sampling matrix 340 may be equal to a quantity of data points 330 in a set 335 of data points 330. A column dimension of the compressive sampling matrix 340 (representing a quantity of data points 330 in a set 335) may be greater than a row dimension of the compressive sampling matrix (representing a dimension of each compressive measurement 325). Accordingly, the plurality of compressive measurements 325 may include a plurality of column matrices.

As shown, a set 335 of data points 330 may be a 1×8 matrix, the compressive sampling matrix 340 may be 2×8 matrix, and a resulting compressive measurement 325 may be a 2×1 matrix. In other words, the compressive sampling reduces eight data points 330 to a compressive measurement 325 including two samples, thereby providing 4× compression. The compressive sampling may be performed using a different quantity of data points 330 in a set 335 and/or using different dimensions for the compressive sampling matrix 340, provided that a quantity of samples of a resulting compressive measurement 325 is less than a quantity of data points 330 in a set 335.

The user device may perform the compressive sampling of the signal using a sliding sampling window technique (e.g., temporal overlapping). In some aspects, the user device may perform the compressive sampling using the sliding sampling window technique with at least 50% overlap (e.g., 50% overlap, 75% overlap, 80% overlap, or the like) of consecutive sampling windows. For example, as shown, each sampling window (corresponding to a set 335 of data points 330) may overlap with a preceding sampling window by 50%. In other words, sequential sets 335 of data points 330 may share one or more data points 330. For example, as shown, a set 335 of eight data points 330 may include four data points 330 that are also included in another set 335 of eight data points 330. The sliding sampling window technique reduces data loss that may otherwise occur at the edges of non-overlapping sampling windows, thereby improving an accuracy of human presence detection. In some aspects, the sliding sampling window technique may use an overlap less than 50% (e.g., 40% overlap, 25% overlap, or the like). In some aspects, the user device may perform the compressive sampling without using the sliding sampling window technique (e.g., zero overlap of consecutive sampling windows) to increase efficiency, but also increasing a likelihood of missing a human presence event.

The compressive measurements 325 resulting from the compressive sampling of the signal may be used to detect whether a person is present in a vicinity of the user device with high accuracy. For example, the compressive measurements 325 (e.g., sub-Nyquist rate samples) may provide comparable accuracy to samples obtained by conventional decimation at or above the Nyquist rate, which is associated with high power consumption. Moreover, the user device may obtain the compressive measurements 325 using an amount of power that is comparable to that used for conventional decimation below the Nyquist rate, which is associated with data loss. The compressive sampling of the signal conserves the data of the signal while conserving power (e.g., which is useful while the user device is operating in the low-power mode).

As shown in FIG. 3C, and by reference number 345, in connection with performing the presence-detection operation (e.g., when the low-power mode is activated), the user device may determine whether a person is present in a vicinity of the user device in accordance with the compressive measurements 325. For example, the user device may determine whether the compressive measurements 325 are indicative of a person approaching toward the user device or leaving from the user device. As an example, the compressive measurements 325 may indicate peaks of the signal that may correspond to vibrations produced by footsteps. In some aspects, the user device may determine whether the compressive measurements 325 are indicative of a person approaching toward the user device or leaving from the user device in accordance with energy intensities associated with the peaks and/or a time duration between peaks, among other examples.

In some aspects, the user device may determine whether the compressive measurements 325 are indicative of a person present in a vicinity of the user device (e.g., a person approaching toward the user device or leaving from the user device) in accordance with whether one or more of the compressive measurements 325 satisfy an energy threshold.

Additionally, or alternatively, the user device may determine whether the compressive measurements 325 are indicative of a person present in a vicinity of the user device (e.g., a person approaching toward the user device or leaving from the user device) using a matched filter. Additionally, or alternatively, the user device may determine, using a convolutional neural network machine learning model, whether the compressive measurements 325 are indicative of a person present in a vicinity of the user device (e.g., a person approaching toward the user device or leaving from the user device). For example, the user device may provide the compressive measurements 325 as input to the machine learning model, and the machine learning model may output an indication of whether the compressive measurements 325 are indicative of a person present in a vicinity of the user device.

In some aspects, the user device may determine whether the compressive measurements 325 are indicative of a person present in a vicinity of the user device (e.g., a person approaching toward the user device or leaving from the user device) using the raw compressive measurements 325 obtained from the compressive sensing. In other words, the user device may detect whether a person present in a vicinity of the user device in accordance with multiple-row column vectors. In some aspects, the user device may convert each raw compressive measurement 325 (e.g., that includes multiple samples) into a single value, and the user device may determine whether the compressive measurements 325 are indicative of a person present in a vicinity of the user device (e.g., a person approaching toward the user device or leaving from the user device) using a plurality of the single values. For example, a compressive measurement 325 (e.g., a column matrix) may be converted to a single value by computing a norm of the compressive measurement 325.

In some aspects, the user device may determine whether the compressive measurements 325 are indicative of a person present in a vicinity of the user device (e.g., a person approaching toward the user device or leaving from the user device), using the raw compressive measurements 325, without reconstruction of the signal. For example, rather than reconstructing the signal from the compressive measurements 325, the user device may determine whether the compressive measurements 325 themselves are indicative of a person present in a vicinity of the user device.

As shown in FIG. 3C, and by reference number 350, the user device may cause the user device to exit the low-power mode responsive to a determination that the compressive measurements 325 are indicative of a person present in the vicinity of the user device. In an example in which the user device is not currently in the low-power mode, the user device may cause the user device to enter (e.g., activate) the low-power mode responsive to a determination that the compressive measurements 325 are indicative of no person being present in the vicinity of the user device. In some aspects, the user device may cause the user device to exit the low-power mode or enter the low-power mode according to whether the user device detects that the person is approaching toward the user device or leaving from the user device. For example, the user device may cause the user device to exit the low-power mode responsive to detecting that the compressive measurements 325 are indicative of a person approaching the user device. As another example, the user device may cause the user device to enter the low-power mode responsive to detecting that the compressive measurements 325 are indicative of a person leaving from the user device.

To cause the user device to enter the low-power mode, the user device may cause one or more processing tasks to be paused or performed less frequently. To cause the user device to exit the low-power mode, the user device may cause one or more processing tasks that were paused or performed less frequently in the low-power mode to be resumed or performed more frequently. Accordingly, the user device may switch from and into the low-power mode according to whether a person is present in the vicinity of the user device. In this way, the user device may reduce power consumption and improve battery life of the user device, when a person is not present in the vicinity of the user device and the user device is not being used, while also providing robust functionality when a person is present in the vicinity of the user device and the user device is more likely to be used.

As shown by reference number 355, the user device may adjust a radio frequency (RF) maximum permissible exposure (MPE) configuration, used by the user device, responsive to a determination that the compressive measurements 325 are indicative of a person present in the vicinity of the user device. For example, the user device may adjust the RF MPE configuration according to whether a person is approaching toward the user device or leaving from the user device. The user device may adjust the MPE configuration to reduce a transmit power that can be used by the user device in accordance with the compressive measurements 325 being indicative of the person present in the vicinity of the user device (e.g., indicative of the person approaching the user device). The user device may adjust the MPE configuration to increase a transmit power that can be used by the user device in accordance with the compressive measurements 325 being indicative of no person being present in the vicinity of the user device (e.g., indicative of the person leaving from the user device). In this way, the user device may adhere to MPE standards while improving uplink communication of the user device.

As indicated above, FIGS. 3A-3C are provided as an example. Other examples may differ from what is described with respect to FIGS. 3A-3C.

Figure 4:
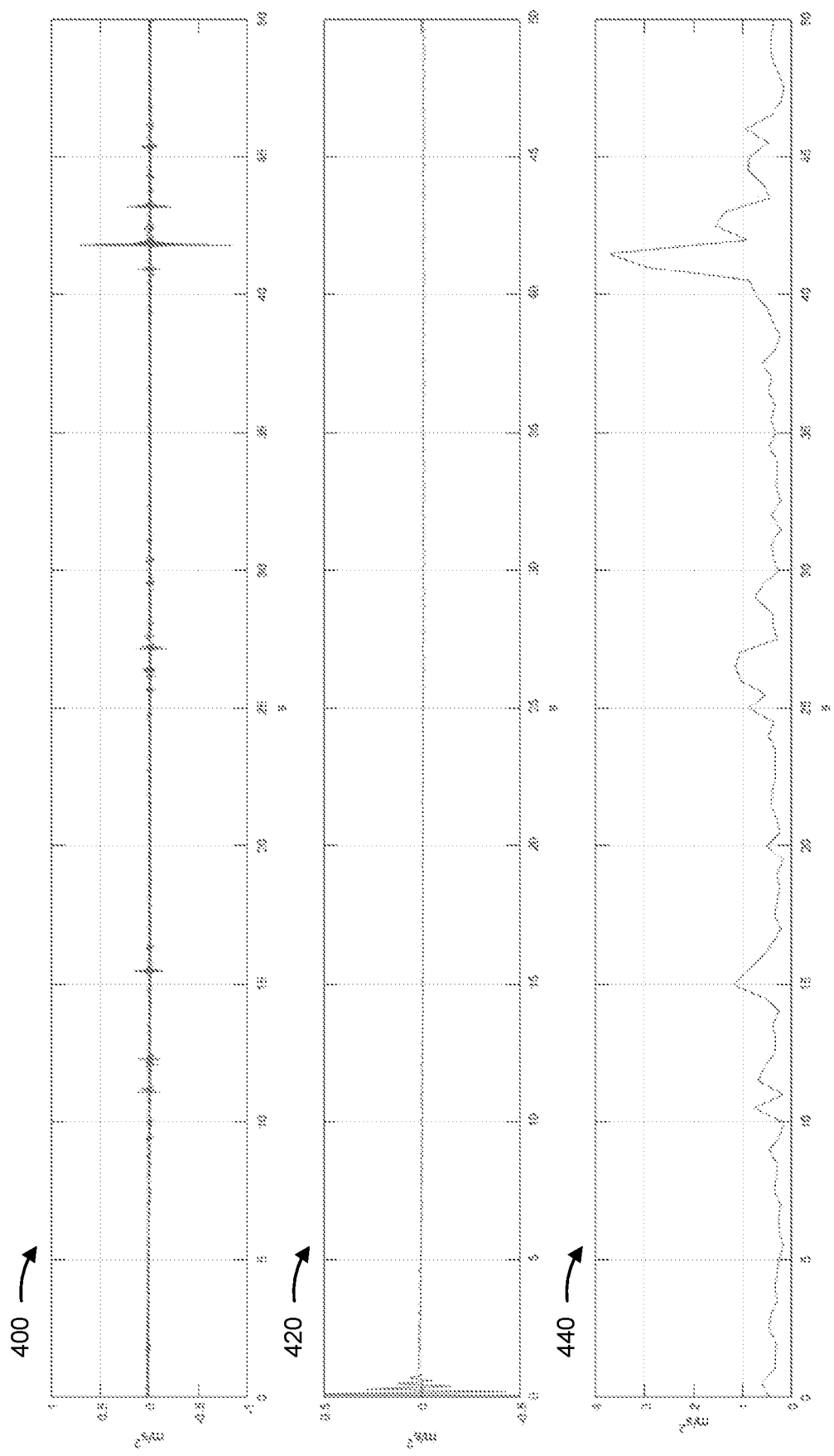
FIG. 4 is a diagram illustrating plots of samples of a signal, in accordance with the present disclosure.

FIG. 4 is a diagram illustrating plots 400, 420, and 440 of samples of a signal, in accordance with the present disclosure. For example, the signal that is sampled may be output by a vibration sensor, such as an accelerometer.

The samples of plot 400 have been taken using a conventional decimation technique at a sampling rate satisfying the Nyquist rate (e.g., at 200 Hz). Plot 400 shows several peaks in the data that can be used for detecting the presence of a person. For example, the peaks may correspond to vibrations caused by footsteps of the person.

The samples of plot 420 have been taken using a conventional decimation technique at a sampling rate below the Nyquist rate (e.g., at 10 Hz). The peaks shown in plot 400 are absent from plot 420 due to the use of a lower sampling rate. Accordingly, the sampling rate used in connection with plot 420 results in lost data.

The samples of plot 440 have been taken using the compressive sampling described herein at a sampling rate below the Nyquist rate (e.g., at 10 Hz). For illustration purposes, plot 440 shows one-dimensional data that may be obtained by converting compressive measurements to single values, as described herein. However, in practice, multi-dimensional data based on raw compressive measurements may be used. Plot 440 shows several peaks in the data that can be used for detecting the presence of a person. For example, the peaks of plot 440 correspond roughly to the peaks of plot 400. Accordingly, data obtained from the compressive sampling may indicate the same pattern that is indicated by the data associated with plot 400, which can be used for detecting the presence of a person.

As indicated above, FIG. 4 is provided as an example. Other examples may differ from what is described with respect to FIG. 4.

Figure 5:
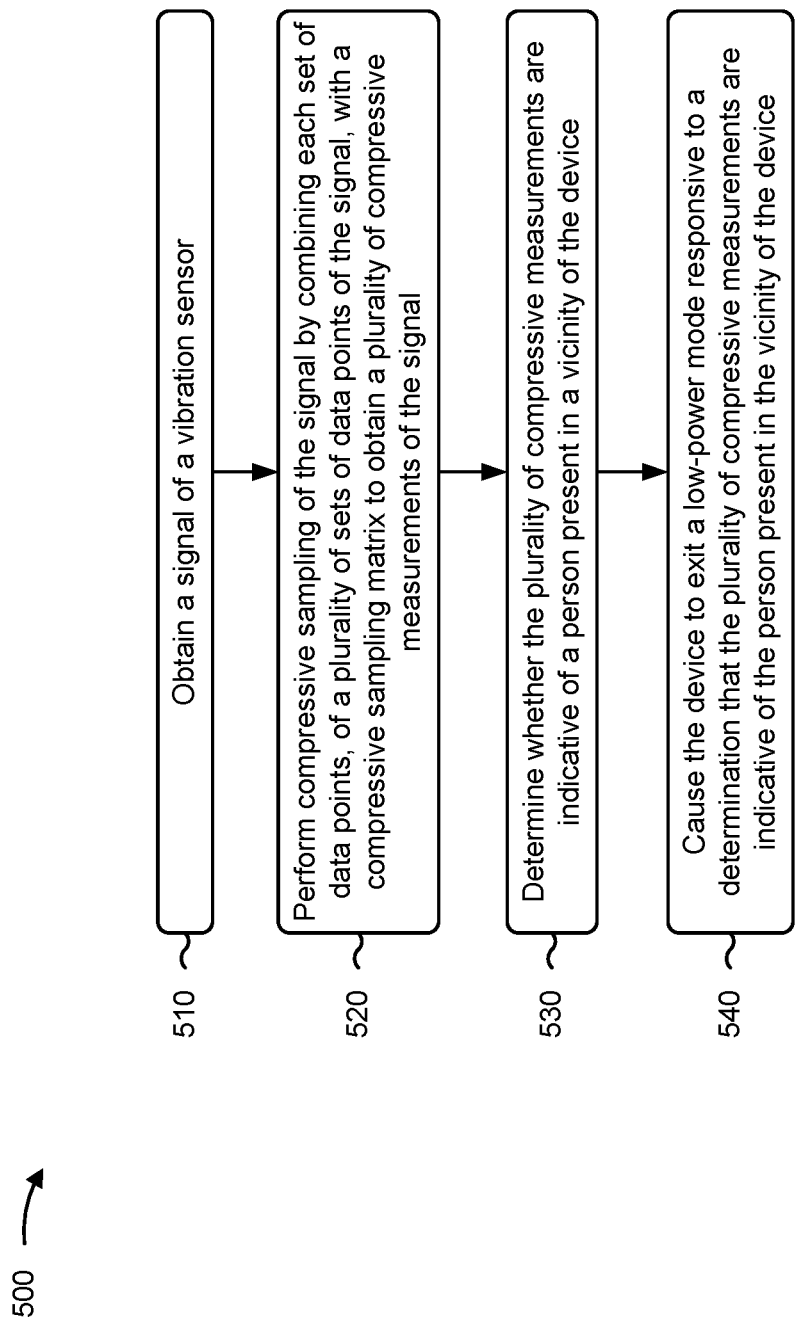
FIG. 5 is a flowchart of an example process associated with presence detection using compressive sampling, in accordance with the present disclosure.

FIG. 5 is a flowchart of an example process 500 associated with presence detection using compressive sampling, in accordance with the present disclosure. In some aspects, one or more process blocks of FIG. 5 are performed by a device (e.g., user device 110). In some aspects, one or more process blocks of FIG. 5 are performed by another device or a group of devices separate from or including the device, such as wireless communication device 120. Additionally, or alternatively, one or more process blocks of FIG. 5 may be performed by one or more components of device 200, such as processor 210, memory 215, input component 220, output component 225, communication component 230, and/or sensor 235.

As shown in FIG. 5, process 500 may include obtaining a signal of a vibration sensor (block 510). For example, the device may obtain a signal of a vibration sensor, as described above.

As further shown in FIG. 5, process 500 may include performing compressive sampling of the signal by combining each set of data points, of a plurality of sets of data points of the signal, with a compressive sampling matrix to obtain a plurality of compressive measurements of the signal (block 520). For example, the device may perform compressive sampling of the signal by combining each set of data points, of a plurality of sets of data points of the signal, with a compressive sampling matrix to obtain a plurality of compressive measurements of the signal, as described above.

As further shown in FIG. 5, process 500 may include determining whether the plurality of compressive measurements are indicative of a person present in a vicinity of the device (block 530). For example, the device may determine whether the plurality of compressive measurements are indicative of a person present in a vicinity of the device, as described above.

As further shown in FIG. 5, process 500 may include causing the device to exit a low-power mode responsive to a determination that the plurality of compressive measurements are indicative of the person present in the vicinity of the device (block 540). For example, the device may cause the device to exit a low-power mode responsive to a determination that the plurality of compressive measurements are indicative of the person present in the vicinity of the device, as described above.

Process 500 may include additional aspects, such as any single aspect or any combination of aspects described below and/or in connection with one or more other processes described elsewhere herein.

In a first aspect, process 500 includes detecting a motion context of the device, and selectively activating the low-power mode in accordance with the motion context.

In a second aspect, alone or in combination with the first aspect, the compressive sampling of the signal is performed responsive to activation of the low-power mode of the device.

In a third aspect, alone or in combination with one or more of the first and second aspects, determining whether the plurality of compressive measurements are indicative of the person present in the vicinity of the device includes determining whether the plurality of compressive measurements are indicative of the person approaching toward the device or leaving from the device.

In a fourth aspect, alone or in combination with one or more of the first through third aspects, determining whether the plurality of compressive measurements are indicative of the person present in the vicinity of the device is in accordance with raw compressive measurements without a reconstruction of the signal.

In a fifth aspect, alone or in combination with one or more of the first through fourth aspects, the compressive sampling of the signal is performed using a sliding sampling window technique.

In a sixth aspect, alone or in combination with one or more of the first through fifth aspects, process 500 includes adjusting an RF MPE configuration responsive to the determination that the plurality of compressive measurements are indicative of the person present in the vicinity of the device.

In a seventh aspect, alone or in combination with one or more of the first through sixth aspects, the compressive sampling matrix is a convolution of a random-value matrix with a matrix representing a shape of a waveform of the signal.

In an eighth aspect, alone or in combination with one or more of the first through seventh aspects, the vibration sensor is an inertial measurement unit of the device.

In a ninth aspect, alone or in combination with one or more of the first through eighth aspects, determining whether the plurality of compressive measurements are indicative of the person present in the vicinity of the device includes determining whether the plurality of compressive measurements are indicative of the person present in the vicinity of the device in accordance with whether one or more of the plurality of compressive measurements satisfy an energy threshold.

In a tenth aspect, alone or in combination with one or more of the first through ninth aspects, determining whether the plurality of compressive measurements are indicative of the person present in the vicinity of the device includes determining whether the plurality of compressive measurements are indicative of the person present in the vicinity of the device using a matched filter.

In an eleventh aspect, alone or in combination with one or more of the first through tenth aspects, determining whether the plurality of compressive measurements are indicative of the person present in the vicinity of the device includes determining, using a convolutional neural network machine learning model, whether the plurality of compressive measurements are indicative of the person present in the vicinity of the device.

Although FIG. 5 shows example blocks of process 500, in some aspects, process 500 includes additional blocks, fewer blocks, different blocks, or differently arranged blocks than those depicted in FIG. 5. Additionally, or alternatively, two or more of the blocks of process 500 may be performed in parallel.

Figure 6:
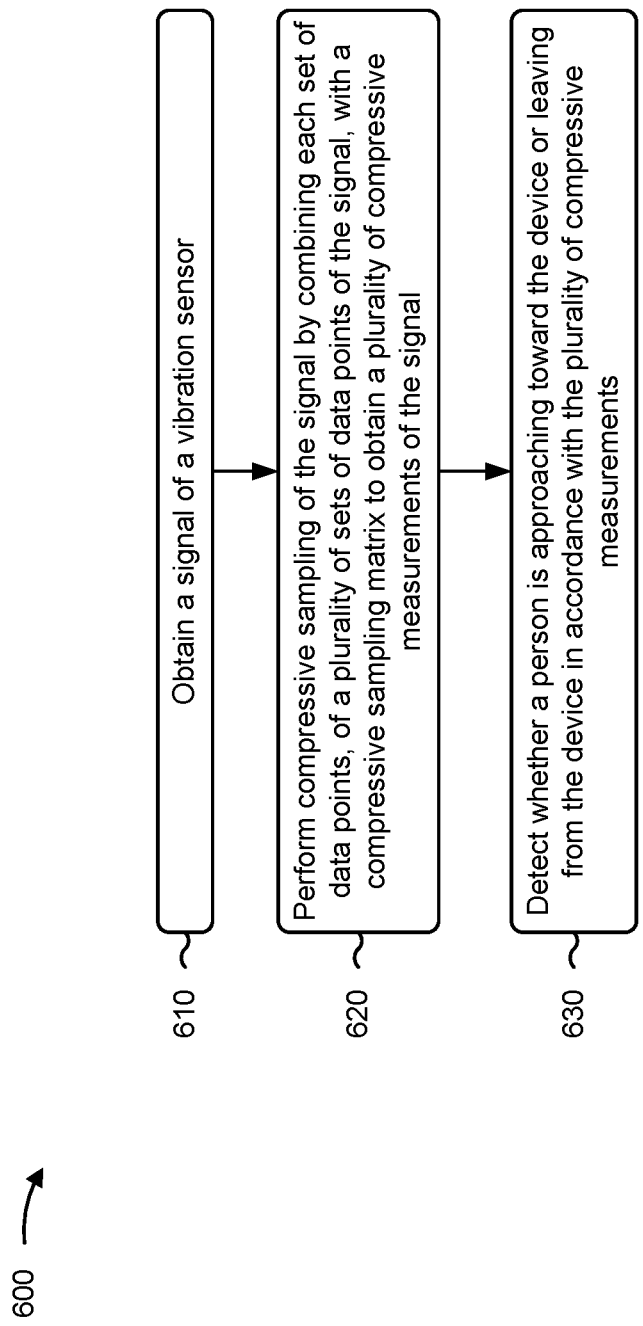
FIG. 6 is a flowchart of an example process associated with presence detection using compressive sampling, in accordance with the present disclosure.

FIG. 6 is a flowchart of an example process 600 associated with presence detection using compressive sampling, in accordance with the present disclosure. In some aspects, one or more process blocks of FIG. 6 are performed by a device (e.g., user device 110). In some aspects, one or more process blocks of FIG. 6 are performed by another device or a group of devices separate from or including the device, such as wireless communication device 120. Additionally, or alternatively, one or more process blocks of FIG. 6 may be performed by one or more components of device 200, such as processor 210, memory 215, input component 220, output component 225, communication component 230, and/or sensor 235.

As shown in FIG. 6, process 600 may include obtaining a signal of a vibration sensor (block 610). For example, the device may obtain a signal of a vibration sensor, as described above.

As further shown in FIG. 6, process 600 may include performing compressive sampling of the signal by combining each set of data points, of a plurality of sets of data points of the signal, with a compressive sampling matrix to obtain a plurality of compressive measurements of the signal (block 620). For example, the device may perform compressive sampling of the signal by combining each set of data points, of a plurality of sets of data points of the signal, with a compressive sampling matrix to obtain a plurality of compressive measurements of the signal, as described above.

As further shown in FIG. 6, process 600 may include detecting whether a person is approaching toward the device or leaving from the device in accordance with the plurality of compressive measurements (block 630). For example, the device may detect whether a person is approaching toward the device or leaving from the device in accordance with the plurality of compressive measurements, as described above.

Process 600 may include additional aspects, such as any single aspect or any combination of aspects described below and/or in connection with one or more other processes described elsewhere herein.

In a first aspect, process 600 includes detecting a motion context of the device, and selectively activating a low-power mode in accordance with the motion context.

In a second aspect, alone or in combination with the first aspect, process 600 includes performing compressive sampling of the signal responsive to activation of a low-power mode of the device.

In a third aspect, alone or in combination with one or more of the first and second aspects, process 600 includes determining whether the plurality of compressive measurements are indicative of the person approaching toward the device or leaving from the device in accordance with raw compressive measurements without a reconstruction of the signal.

In a fourth aspect, alone or in combination with one or more of the first through third aspects, process 600 includes performing compressive sampling of the signal using a sliding sampling window technique.

In a fifth aspect, alone or in combination with one or more of the first through fourth aspects, process 600 includes adjusting an RF MPE configuration according to whether the person is approaching toward the device or leaving from the device.

In a sixth aspect, alone or in combination with one or more of the first through fifth aspects, the compressive sampling matrix is a convolution of a random-value matrix with a matrix representing a shape of a waveform of the signal.

In a seventh aspect, alone or in combination with one or more of the first through sixth aspects, the vibration sensor is an inertial measurement unit of the device.

In an eighth aspect, alone or in combination with one or more of the first through seventh aspects, process 600 includes determining whether the plurality of compressive measurements are indicative of the person approaching toward the device or leaving from the device in accordance with whether one or more of the plurality of compressive measurements satisfy an energy threshold.

In a ninth aspect, alone or in combination with one or more of the first through eighth aspects, process 600 includes determining whether the plurality of compressive measurements are indicative of the person approaching toward the device or leaving from the device using a matched filter.

In a tenth aspect, alone or in combination with one or more of the first through ninth aspects, process 600 includes determining, using a convolutional neural network machine learning model, whether the plurality of compressive measurements are indicative of the person approaching toward the device or leaving from the device.

In an eleventh aspect, alone or in combination with one or more of the first through tenth aspects, process 600 includes causing the device to exit a low-power mode or enter the low-power mode according to whether the person is approaching toward the device or leaving from the device.

Although FIG. 6 shows example blocks of process 600, in some aspects, process 600 includes additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method, comprising: obtaining, by a device, a signal of a vibration sensor; performing, by the device, compressive sampling of the signal by combining each set of data points, of a plurality of sets of data points of the signal, with a compressive sampling matrix to obtain a plurality of compressive measurements of the signal; determining, by the device, whether the plurality of compressive measurements are indicative of a person present in a vicinity of the device; and causing, by the device, the device to exit a low-power mode responsive to a determination that the plurality of compressive measurements are indicative of the person present in the vicinity of the device.

Aspect 2: The method of Aspect 1, further comprising: detecting a motion context of the device; and selectively activating the low-power mode in accordance with the motion context.

Aspect 3: The method of any of Aspects 1-2, wherein the compressive sampling of the signal is performed responsive to activation of the low-power mode of the device.

Aspect 4: The method of any of Aspects 1-3, wherein determining whether the plurality of compressive measurements are indicative of the person present in the vicinity of the device comprises: determining whether the plurality of compressive measurements are indicative of the person approaching toward the device or leaving from the device.

Aspect 5: The method of any of Aspects 1-4, wherein determining whether the plurality of compressive measurements are indicative of the person present in the vicinity of the device is in accordance with raw compressive measurements without a reconstruction of the signal.

Aspect 6: The method of any of Aspects 1-5, wherein the compressive sampling of the signal is performed using a sliding sampling window technique.

Aspect 7: The method of any of Aspects 1-6, further comprising: adjusting a radio frequency maximum permissible exposure (MPE) configuration responsive to the determination that the plurality of compressive measurements are indicative of the person present in the vicinity of the device.

Aspect 8: The method of any of Aspects 1-7, wherein the compressive sampling matrix is a convolution of a random-value matrix with a matrix representing a shape of a waveform of the signal.

Aspect 9: The method of any of Aspects 1-8, wherein the vibration sensor is an inertial measurement unit of the device.

Aspect 10: The method of any of Aspects 1-9, wherein determining whether the plurality of compressive measurements are indicative of the person present in the vicinity of the device comprises: determining whether the plurality of compressive measurements are indicative of the person present in the vicinity of the device in accordance with whether one or more of the plurality of compressive measurements satisfy an energy threshold.

Aspect 11: The method of any of Aspects 1-10, wherein determining whether the plurality of compressive measurements are indicative of the person present in the vicinity of the device comprises: determining whether the plurality of compressive measurements are indicative of the person present in the vicinity of the device using a matched filter.

Aspect 12: The method of any of Aspects 1-11, wherein determining whether the plurality of compressive measurements are indicative of the person present in the vicinity of the device comprises: determining, using a convolutional neural network machine learning model, whether the plurality of compressive measurements are indicative of the person present in the vicinity of the device.

Aspect 13: A device, comprising: one or more memories; and one or more processors, coupled to the one or more memories, configured to: obtain a signal of a vibration sensor; perform compressive sampling of the signal by combining each set of data points, of a plurality of sets of data points of the signal, with a compressive sampling matrix to obtain a plurality of compressive measurements of the signal; and detect, by the device, whether a person is approaching toward the device or leaving from the device in accordance with the plurality of compressive measurements.

Aspect 14: The device of Aspect 13, wherein the one or more processors are further configured to: detect a motion context of the device; and selectively activate a low-power mode in accordance with the motion context.

Aspect 15: The device of any of Aspects 13-14, wherein the one or more processors, to perform compressive sampling of the signal, are configured to: perform compressive sampling of the signal responsive to activation of a low-power mode of the device.

Aspect 16: The device of any of Aspects 13-15, wherein the one or more processors, to determine whether the plurality of compressive measurements are indicative of the person approaching toward the device or leaving from the device, are configured to: determine whether the plurality of compressive measurements are indicative of the person approaching toward the device or leaving from the device in accordance with raw compressive measurements without a reconstruction of the signal.

Aspect 17: The device of any of Aspects 13-16, wherein the one or more processors, to perform compressive sampling of the signal, are configured to: perform compressive sampling of the signal using a sliding sampling window technique.

Aspect 18: The device of any of Aspects 13-17, wherein the one or more processors are further configured to: adjust a radio frequency maximum permissible exposure (MPE) configuration according to whether the person is approaching toward the device or leaving from the device.

Aspect 19: The device of any of Aspects 13-18, wherein the compressive sampling matrix is a convolution of a random-value matrix with a matrix representing a shape of a waveform of the signal.

Aspect 20: The device of any of Aspects 13-19, wherein the vibration sensor is an inertial measurement unit of the device.

Aspect 21: The device of any of Aspects 13-20, wherein the one or more processors, to determine whether the plurality of compressive measurements are indicative of the person approaching toward the device or leaving from the device, are configured to: determine whether the plurality of compressive measurements are indicative of the person approaching toward the device or leaving from the device in accordance with whether one or more of the plurality of compressive measurements satisfy an energy threshold.

Aspect 22: The device of any of Aspects 13-21, wherein the one or more processors, to determine whether the plurality of compressive measurements are indicative of the person approaching toward the device or leaving from the device, are configured to: determine whether the plurality of compressive measurements are indicative of the person approaching toward the device or leaving from the device using a matched filter.

Aspect 23: The device of any of Aspects 13-22, wherein the one or more processors, to determine whether the plurality of compressive measurements are indicative of the person approaching toward the device or leaving from the device, are configured to: determine, using a convolutional neural network machine learning model, whether the plurality of compressive measurements are indicative of the person approaching toward the device or leaving from the device.

Aspect 24: The device of any of Aspects 13-23, wherein the one or more processors are further configured to: cause the device to exit a low-power mode or enter the low-power mode according to whether the person is approaching toward the device or leaving from the device.

Aspect 25: A non-transitory computer-readable medium storing a set of instructions, the set of instructions comprising: one or more instructions that, when executed by one or more processors of a device, cause the device to: obtain a signal of a vibration sensor; perform compressive sampling of the signal by combining each set of data points, of a plurality of sets of data points of the signal, with a compressive sampling matrix to obtain a plurality of compressive measurements of the signal; determine whether the plurality of compressive measurements are indicative of a person present in a vicinity of the device; and cause the device to exit a low-power mode responsive to a determination that the plurality of compressive measurements are indicative of the person present in the vicinity of the device.

Aspect 26: The non-transitory computer-readable medium of Aspect 25, wherein the compressive sampling of the signal is performed responsive to activation of the low-power mode of the device.

Aspect 27: The non-transitory computer-readable medium of any of Aspects 25-26, wherein determining whether the plurality of compressive measurements are indicative of the person present in the vicinity of the device is in accordance with raw compressive measurements without a reconstruction of the signal.

Aspect 28: An apparatus, comprising: means for obtaining a signal of a vibration sensor; means for performing compressive sampling of the signal by combining each set of data points, of a plurality of sets of data points of the signal, with a compressive sampling matrix to obtain a plurality of compressive measurements of the signal; and means for detecting whether a person is approaching toward the apparatus or leaving from the apparatus in accordance with the plurality of compressive measurements.

Aspect 29: The apparatus of Aspect 28, wherein the means for performing compressive sampling of the signal comprise: means for performing compressive sampling of the signal using a sliding sampling window technique.

Aspect 30: The apparatus of any of Aspects 28-29, further comprising: means for adjusting a radio frequency maximum permissible exposure (MPE) configuration according to whether the person is approaching toward the apparatus or leaving from the apparatus.

Aspect 31: A system configured to perform one or more operations recited in one or more of Aspects 1-30.

Aspect 32: An apparatus comprising means for performing one or more operations recited in one or more of Aspects 1-30.

Aspect 33: A non-transitory computer-readable medium storing a set of instructions, the set of instructions comprising one or more instructions that, when executed by a device, cause the device to perform one or more operations recited in one or more of Aspects 1-30.

Aspect 34: A computer program product comprising instructions or code for executing one or more operations recited in one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, a signal of a vibration sensor;
   performing, by the device, compressive sampling of the signal by combining each set of data points, of a plurality of sets of data points of the signal, with a compressive sampling matrix to obtain a plurality of compressive measurements of the signal;
   determining, by the device, whether the plurality of compressive measurements are indicative of a person present in a vicinity of the device; and
   causing, by the device, the device to exit a low-power mode responsive to a determination that the plurality of compressive measurements are indicative of the person present in the vicinity of the device.

2. The method of claim 1, further comprising:
   detecting a motion context of the device; and
   selectively activating the low-power mode in accordance with the motion context.

3. The method of claim 1, wherein the compressive sampling of the signal is performed responsive to activation of the low-power mode of the device.

4. The method of claim 1, wherein determining whether the plurality of compressive measurements are indicative of the person present in the vicinity of the device comprises:
   determining whether the plurality of compressive measurements are indicative of the person approaching toward the device or leaving from the device.

5. The method of claim 1, wherein determining whether the plurality of compressive measurements are indicative of the person present in the vicinity of the device is in accordance with raw compressive measurements without a reconstruction of the signal.

6. The method of claim 1, wherein the compressive sampling of the signal is performed using a sliding sampling window technique.

7. The method of claim 1, further comprising:
   adjusting a radio frequency maximum permissible exposure (MPE) configuration responsive to the determination that the plurality of compressive measurements are indicative of the person present in the vicinity of the device.

8. The method of claim 1, wherein the compressive sampling matrix is a convolution of a random-value matrix with a matrix representing a shape of a waveform of the signal.

9. The method of claim 1, wherein the vibration sensor is an inertial measurement unit of the device.

10. The method of claim 1, wherein determining whether the plurality of compressive measurements are indicative of the person present in the vicinity of the device comprises:
    determining whether the plurality of compressive measurements are indicative of the person present in the vicinity of the device in accordance with whether one or more of the plurality of compressive measurements satisfy an energy threshold.

11. The method of claim 1, wherein determining whether the plurality of compressive measurements are indicative of the person present in the vicinity of the device comprises:
    determining whether the plurality of compressive measurements are indicative of the person present in the vicinity of the device using a matched filter.

12. The method of claim 1, wherein determining whether the plurality of compressive measurements are indicative of the person present in the vicinity of the device comprises:
    determining, using a convolutional neural network machine learning model, whether the plurality of compressive measurements are indicative of the person present in the vicinity of the device.

13. A device, comprising:
    one or more memories; and
    one or more processors, coupled to the one or more memories, configured to:
      obtain a signal of a vibration sensor;
      perform compressive sampling of the signal by combining each set of data points, of a plurality of sets of data points of the signal, with a compressive sampling matrix to obtain a plurality of compressive measurements of the signal; and
      detect, by the device, whether a person is approaching toward the device or leaving from the device in accordance with the plurality of compressive measurements.

14. The device of claim 13, wherein the one or more processors are further configured to:
    detect a motion context of the device; and
    selectively activate a low-power mode in accordance with the motion context.

15. The device of claim 13, wherein the one or more processors, to perform compressive sampling of the signal, are configured to:
    perform compressive sampling of the signal responsive to activation of a low-power mode of the device.

16. The device of claim 13, wherein the one or more processors, to determine whether the plurality of compressive measurements are indicative of the person approaching toward the device or leaving from the device, are configured to:
    determine whether the plurality of compressive measurements are indicative of the person approaching toward the device or leaving from the device in accordance with raw compressive measurements without a reconstruction of the signal.

17. The device of claim 13, wherein the one or more processors, to perform compressive sampling of the signal, are configured to:
    perform compressive sampling of the signal using a sliding sampling window technique.

18. The device of claim 13, wherein the one or more processors are further configured to:
adjust a radio frequency maximum permissible exposure (MPE) configuration according to whether the person is approaching toward the device or leaving from the device.

19. The device of claim 13, wherein the compressive sampling matrix is a convolution of a random-value matrix with a matrix representing a shape of a waveform of the signal.

20. The device of claim 13, wherein the vibration sensor is an inertial measurement unit of the device.

21. The device of claim 13, wherein the one or more processors, to determine whether the plurality of compressive measurements are indicative of the person approaching toward the device or leaving from the device, are configured to:
determine whether the plurality of compressive measurements are indicative of the person approaching toward the device or leaving from the device in accordance with whether one or more of the plurality of compressive measurements satisfy an energy threshold.

22. The device of claim 13, wherein the one or more processors, to determine whether the plurality of compressive measurements are indicative of the person approaching toward the device or leaving from the device, are configured to:
determine whether the plurality of compressive measurements are indicative of the person approaching toward the device or leaving from the device using a matched filter.

23. The device of claim 13, wherein the one or more processors, to determine whether the plurality of compressive measurements are indicative of the person approaching toward the device or leaving from the device, are configured to:
determine, using a convolutional neural network machine learning model, whether the plurality of compressive measurements are indicative of the person approaching toward the device or leaving from the device.

24. The device of claim 13, wherein the one or more processors are further configured to:
cause the device to exit a low-power mode or enter the low-power mode according to whether the person is approaching toward the device or leaving from the device.

25. A non-transitory computer-readable medium storing a set of instructions, the set of instructions comprising:
one or more instructions that, when executed by one or more processors of a device, cause the device to:
obtain a signal of a vibration sensor;
perform compressive sampling of the signal by combining each set of data points, of a plurality of sets of data points of the signal, with a compressive sampling matrix to obtain a plurality of compressive measurements of the signal;
determine whether the plurality of compressive measurements are indicative of a person present in a vicinity of the device; and
cause the device to exit a low-power mode responsive to a determination that the plurality of compressive measurements are indicative of the person present in the vicinity of the device.

26. The non-transitory computer-readable medium of claim 25, wherein the compressive sampling of the signal is performed responsive to activation of the low-power mode of the device.

27. The non-transitory computer-readable medium of claim 25, wherein determining whether the plurality of compressive measurements are indicative of the person present in the vicinity of the device is in accordance with raw compressive measurements without a reconstruction of the signal.

28. An apparatus, comprising:
means for obtaining a signal of a vibration sensor;
means for performing compressive sampling of the signal by combining each set of data points, of a plurality of sets of data points of the signal, with a compressive sampling matrix to obtain a plurality of compressive measurements of the signal; and
means for detecting whether a person is approaching toward the apparatus or leaving from the apparatus in accordance with the plurality of compressive measurements.

29. The apparatus of claim 28, wherein the means for performing compressive sampling of the signal comprise:
means for performing compressive sampling of the signal using a sliding sampling window technique.

30. The apparatus of claim 28, further comprising:
means for adjusting a radio frequency maximum permissible exposure (MPE) configuration according to whether the person is approaching toward the apparatus or leaving from the apparatus.

* * * * *